(12) United States Patent
Lee

(10) Patent No.: US 10,767,401 B2
(45) Date of Patent: Sep. 8, 2020

(54) FUEL DOOR APPARATUS FOR VEHICLE

(71) Applicants: HYUNDAI MOTOR COMPANY, Seoul (KR); KIA MOTORS CORPORATION, Seoul (KR)

(72) Inventor: Seong Muk Lee, Yongin-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 119 days.

(21) Appl. No.: 16/197,229

(22) Filed: Nov. 20, 2018

(65) Prior Publication Data

US 2020/0095810 A1 Mar. 26, 2020

(30) Foreign Application Priority Data

Sep. 21, 2018 (KR) .................. 10-2018-0113514

(51) Int. Cl.
| | |
|---|---|
| *E05B 83/34* | (2014.01) |
| *E05B 85/26* | (2014.01) |
| *E05B 79/08* | (2014.01) |
| *B60K 15/05* | (2006.01) |
| *E05B 79/10* | (2014.01) |

(52) U.S. Cl.
CPC .......... *E05B 83/34* (2013.01); *B60K 15/05* (2013.01); *E05B 79/08* (2013.01); *E05B 79/10* (2013.01); *E05B 85/26* (2013.01); *B60K 2015/053* (2013.01); *B60K 2015/0576* (2013.01)

(58) Field of Classification Search
CPC .......... E05B 83/34; E05B 79/10; E05B 79/08; E05B 85/26; B60K 15/05; B60K 2015/053; B60K 2015/0576
USPC ...................................... 296/97.22
See application file for complete search history.

(56) References Cited

U.S. PATENT DOCUMENTS 9,327,594 B2 * 5/2016 Georgi ............... B60K 15/05

FOREIGN PATENT DOCUMENTS

KR 10-1776835 B1 9/2017

* cited by examiner

*Primary Examiner* — Pinel E Romain

(74) *Attorney, Agent, or Firm* — Morgan, Lewis & Bockius LLP

(57) ABSTRACT

A fuel door apparatus for a vehicle includes: a fuel door rotatable connected to a door housing, connected with an elastic member of the door housing, and including a guide pin; a locking lever rotatably connected to the door housing, having a first end portion disposed on a rotation radius of the guide pin; a restraining lever spaced apart from the locking lever to be rotatable on the door housing, having a first end portion disposed in a radius, on which a second end portion of the locking lever rotates, and latched on the locking lever in the closed position; and a drive controller being in contact with or separated from the restraining lever depending on whether the fuel door is opened or closed to selectively allow rotation of the restraining lever.

14 Claims, 5 Drawing Sheets

FUEL DOOR APPARATUS FOR VEHICLE

CROSS REFERENCE TO RELATED APPLICATION

The present application claims priority of Korean Patent Application No. 10-2018-0113514 filed on Sep. 21, 2018, in the Korean Intellectual Property Office, the entire contents of which is incorporated herein for all purposes by this reference.

TECHNICAL FIELD

The present disclosure relates to a fuel door apparatus for a vehicle in which a locking structure and a pop-up structure of a fuel door are integrated.

BACKGROUND

Generally, in order to inject fuel into a vehicle, a fuel door installed at the rear of a vehicle body needs to be open to inject fuel and a fuel cap coupled to the end portion of a fuel hose drawn out from a fuel tank needs to be detached. That is, as a driver operates a lever installed in the vehicle interior, a fuel door installed outside the vehicle is opened, and then the driver or fueler rotates the fuel cap to inject fuel.

This fuel door assembly is fixed to one side of a fuel housing to open and close the front of the fuel housing, and a hinge bracket is provided to couple with a hinge a fuel door to the fuel housing. Further, a catch assembly is provided to keep the fuel door closed to close the fuel housing, a pop-up assembly that pushes the fuel door so that the fuel door is automatically opened when the fuel door is open from the fuel housing, is also provided.

However, such a fuel door assembly requires a large number of components because the catch assembly and the pop-up assembly are separately constructed, and thus there were disadvantages in terms of cost, weight, and layout space, and the like.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure has been made keeping in mind the above problems occurring in the related art, and the present disclosure is intended to propose a fuel door apparatus for a vehicle that simplifies the structure by integrating a separate catch assembly and a pop-up assembly and thus reduces cost and weight.

A fuel door apparatus for a vehicle according to an exemplary embodiment of the present disclosure may include: a fuel door rotatable connected to a door housing, wherein the fuel door is connected with an elastic member of the door housing to receive an elastic force in an opening direction and includes a guide pin elastically moving; a locking lever rotatably connected to the door housing, wherein the locking lever has a first end portion disposed on a rotation radius of the guide pin, such that the guide pin passes by the locking lever along the rotation radius when the fuel door rotates from an opening position to a closed position, and the locking lever rotates with the guide pin when the fuel door rotates from the closed position to the opening position; a restraining lever spaced apart from the locking lever to be rotatable on the door housing, wherein the restraining lever has a first end portion disposed in a radius, on which a second end portion of the locking lever rotates, and is latched on the locking lever in the closed position; and a drive controller disposed in the door housing, wherein the driver controller is in contact with or separated from the restraining lever depending on whether the fuel door is opened or closed to selectively allow rotation of the restraining lever.

A hinge pin may be mounted on the door housing to be rotatable, and the fuel door is installed on the door housing to be rotatable through the hinge pin; and one end portion of the elastic member may be connected with the door housing and the other end portion thereof is fixed to a hinge pin to provide an elastic force so that the fuel door can be rotated together with the hinge pin.

The locking lever may be disposed apart from a rotation center point of the fuel door and installed on the door housing to be rotatable through a first hinge part; and the one end portion of the locking lever may have a curved surface at a portion corresponding to the guide pin at the closed position of the fuel door.

A dented portion in which the guide pin is entered when the fuel door rotates at the opening position in the closed direction, may be formed at the one end portion of the locking lever, and the inclination of the dented portion gradually may increase in the closed direction.

An inserting groove into which the guide pin is inserted may be formed at the fuel door; and the guide pin may be elastically supported by an elastic spring in the inserting groove.

The restraining lever may be installed on the door housing to be rotatable through a second hinge part; and a catching protrusion which protrudes toward the locking lever and the other end portion the locking lever is caught on may be formed at one end portion of the restraining lever.

An end of the other end portion of the locking lever may be formed to be curved; and the catching protrusion of the restraining lever may be formed to protrude in a streamline shape.

The one end portion of the locking lever and the other end portion of the restraining lever may be connected with each other through a restoring spring.

A restraining hole may be formed at the other end portion of the restraining lever; and a retraining pin, which is inserted into the restraining hole to limit the rotation of the restraining lever when the drive controller is operated, may be further provided.

The drive controller may be disposed such that the restraining pin corresponds to the restraining hole of restraining lever in a state that the fuel door is in the closed position and the one end portion of restraining lever is caught on the other end portion of the locking lever.

the door housing is composed of a mounting body at which the locking lever, the restraining lever and the drive controller are mounted, and a fuel supply space provided with a fuel inlet; and The fuel door may be composed of a door plate of which one end portion is extended to and mounted on the mounting body and the other end portion is extended to the fuel supply space, and a door panel coupled to the door plate and formed to close the fuel supply space.

The drive controller and one end portion of the door plate are installed in the mounting body and the locking lever and the restraining lever may be installed outside of the mounting body; and the guide pin may be provided at the one end portion of door plate and exposed from the interior toward the exterior of the mounting body.

A guide hole may be formed at the mounting body to extend along a radius that the guide pin is rotated together with the rotation of the fuel door.

According to the fuel door apparatus for the vehicle, the open or close operation of the fuel door is clearly performed according to the opening or closing will of the fuel door, the structure that the fuel door is popped up when the fuel door is opened and the structure that the fuel door is locked when the fuel door is closed, are integrated, thereby simplifying the structure thereof, reducing manufacturing cost and weight.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinafter, a fuel door apparatus for a vehicle according to a preferred exemplary embodiment of the present disclosure will be described with reference to the attached drawing.

Figure 1:
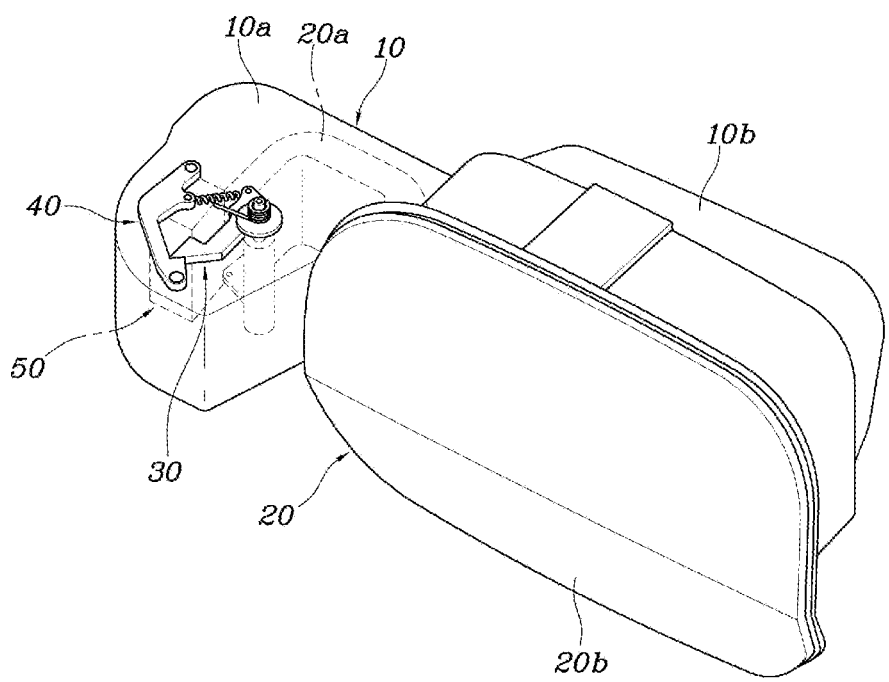
FIGS. 1 to 2 are drawings illustrating a fuel door apparatus for a vehicle according to an exemplary embodiment of the present disclosure.
Figure 2:
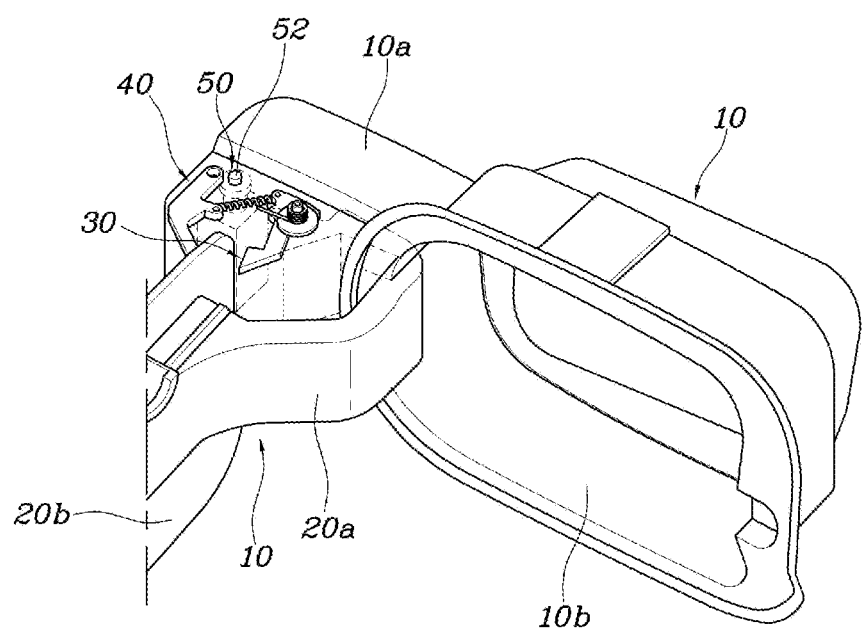
Figure 3:
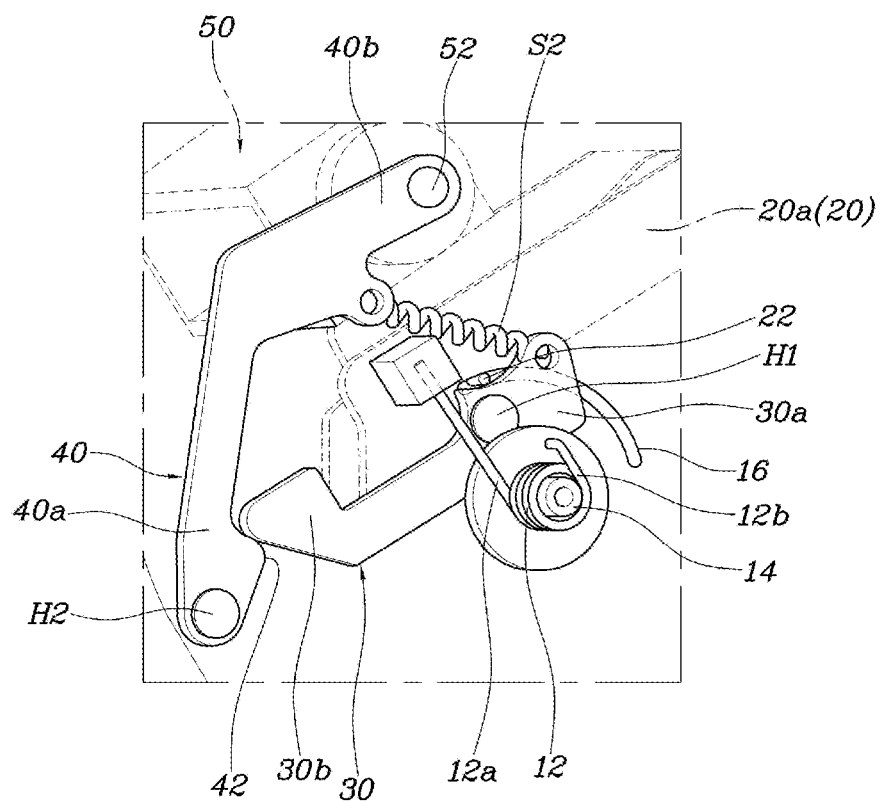
FIGS. 3 to 5 are drawings illustrating a fuel door of the fuel door apparatus for the vehicle shown in FIG. 1.
Figure 4:
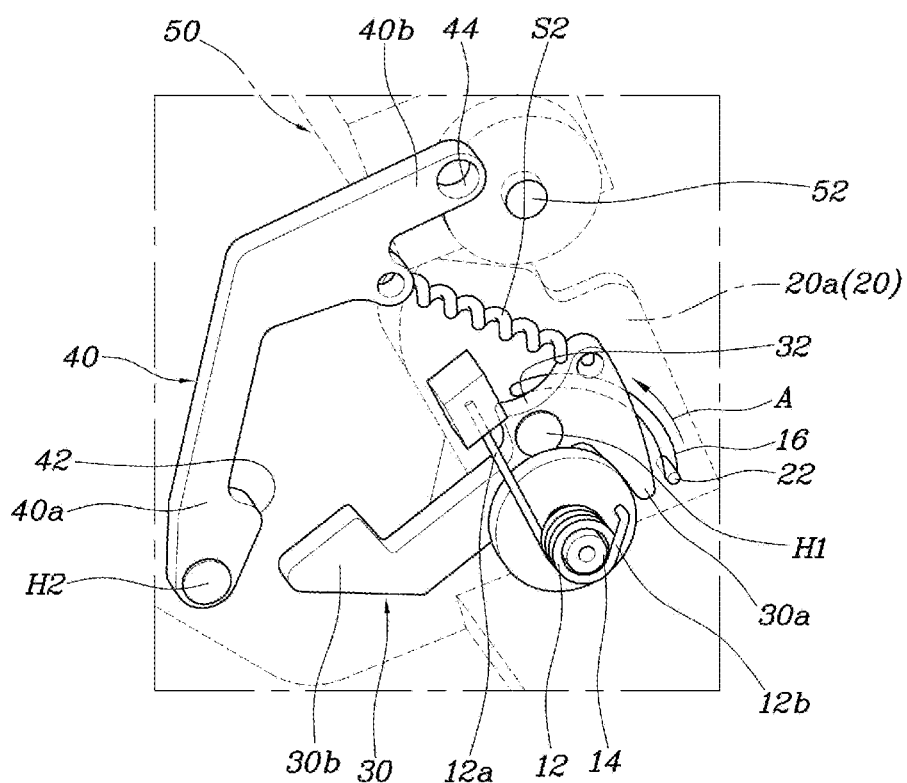
Figure 5:
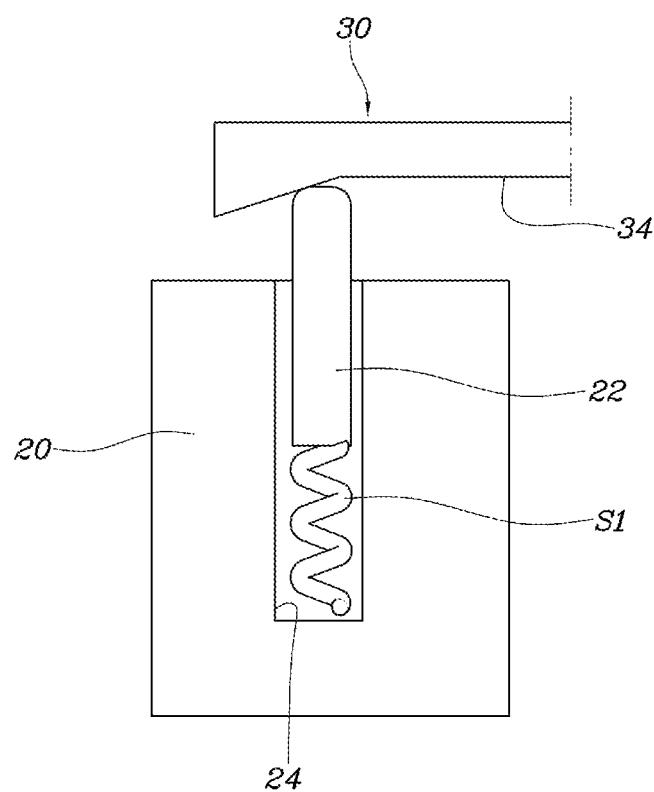

FIGS. 1 to 2 are drawings illustrating a fuel door apparatus for a vehicle according to an exemplary embodiment of the present disclosure, and FIGS. 3 to 5 are drawings illustrating a fuel door of the fuel door apparatus for the vehicle shown in FIG. 1.

In describing the present disclosure, a closed position of a fuel door 20 is shown in FIG. 1 and FIG. 3, and an opening position of the fuel door 20 corresponds to FIG. 2 and FIG. 4. Thus, the opening direction of the fuel door 20 becomes clockwise in the drawing, and the closed direction of the fuel door 20 becomes anticlockwise in the drawing.

A fuel door apparatus for a vehicle according to the present disclosure, as shown in FIGS. 1 to 2, may include a fuel door 20 provided to be rotatable on a door housing 10, connected with an elastic member 12 provided at the door housing 10 to receive an elastic force at the door housing 10 in an opening direction thereof, and having a guide pin 22 elastically moving; a locking lever 30 provided on the door housing 10 to be rotatable, having one end portion 30a disposed in a rotation radius of the guide pin 22 by the rotation of the fuel door 20, through which the guide pin 22 passes when the fuel door 20 rotates from an opening position thereof in a closed direction but in which the guide pin 22 is caught and rotates with the guide pin 22 when the fuel door 20 rotates from a closed position thereof in the opening direction; a restraining lever 40 disposed apart from the locking lever 30 and provided on the door housing 10 to be rotatable, provided with an one end portion 40a disposed in a radius that the other end portion 30b of the locking lever 30 is rotated, and formed such that the locking lever 30 is caught on; and a drive controller 50 provided on the door housing 10, and contacted with or separated from the restraining lever 40 depending on whether the fuel door 20 is opened or closed to selectively allow the rotation of the restraining lever 40.

The fuel door 20 is installed to be rotatable on the door housing 10, and the fuel door 20 may be opened or locked by the locking lever 30, the restraining lever 40 and the drive controller 50. Herein, the fuel door 20 receives the elastic force from the elastic member 12 provided on the door housing 10, so that the fuel door 20 can be popped up by the elastic force of the elastic member 12 when opened. The fuel door 20 is provided with the guide pin 22 and the guide pin 22 is contacted with the locking lever 30, so that the rotation of the guide pin 22 is allowed depending on whether the locking lever 30 is rotated or not, and thus, the fuel door 20 maintains the closed position thereof or can move to the opening position.

This is due to the relationship that the locking lever 30, the restraining lever 40 and the drive controller 50 move together, and the one end portion 30a of the locking lever 30 is disposed in the rotation radius of the guide pin 22 by the rotation of the fuel door 20, so that the guide pin 22 passes through the locking lever 30 when the fuel door 20 rotates from the opening position thereof in a closed direction but the guide pin 22 is caught at the locking lever 30 and rotates with the locking lever 30 when the fuel door 20 rotates from the closed position thereof in the opening direction. That is, the guide pin 22 passes through the locking lever 30 when the fuel door 20 rotates from the opening position in the closed direction so that the fuel door 20 can be returned in a next state it can be opened at the closed position, and the guide pin 22 is contacted with the locking lever 30 when the fuel door 20 rotates from the closed position in the opening direction but the locking lever 30 is restrained by the restraining lever 40 so that the guide pin 22 cannot be rotated and the locking lever 30 is fixed together with the guide pin 22 at the closed position of the fuel door 20.

Herein, the rotation of the restraining lever 40 is selectively allowed by the drive controller 50. The drive controller 50 is configured to be separated apart from the restraining lever 40 when the user operates a switch for opening the fuel door inside the vehicle.

In the present disclosure, as shown in FIG. 1, the position of the restraining lever 40 is fixed when the drive controller 50 is contacted with the restraining lever 40, the rotation of the locking lever 30 caught on the restraining lever 40 is limited, and the guide pin 22 of the fuel door 20 is caught on the locking lever 30 so that the closed state of the fuel door 20 is maintained.

Conversely, as shown in FIG. 2, in a state that the drive controller 50 is separated apart from the restraining lever 40, the guide pin 22 of the fuel door 20 rotates the locking lever 30 when the user pushes the fuel door 20 with opening intention of the fuel door 20, so that the locking lever 30 is separated from the restraining lever 40, and at this time, the fuel door 20 can be rotated in the opening direction by the elastic force of the elastic member 12.

More specifically describing the above-described the present disclosure, as shown in FIG. 3, a hinge pin 14 may be coupled to the door housing 10 to be rotatable and the fuel door 20 may be installed at the door housing 10 to be rotatable through the hinge pin 14. The fuel door 20 is coupled to the hinge pin 14 mounted to be rotatable on the door housing 10 so that it can be installed to be rotatable at the door housing 10. The door housing 10 is provided with the elastic member 12, and one end portion 12a of the elastic part 12 is connected with the door housing 10 and the other end portion 12b of the elastic member 12 is fixed at the hinge pin 14 to provide the elastic force so that the fuel door 20 can be rotated together with the hinge pin 14. Herein, the elastic member 12 may be composed of a coil spring to provide the elastic force to the fuel door 20 in the opening direction.

On the other hand, as shown in FIGS. 3 to 4, the locking lever 30 may be disposed apart from the rotation center point of the fuel door 20 and installed to be rotatable through a first hinge part H1 at the door housing 10, the one end portion 30a may be formed to have a curved surface 32 at a portion which corresponds to the guide pin 22 at the closed position of the fuel door 20.

Herein, the first hinge part H1 may be disposed adjacent to the rotation center point of the fuel door 20 apart from it, which allows the guide pin 22 provided on the fuel door 20 and the locking lever 30 to be moved together when the fuel door 20 is rotated. Further, the one end portion 30a of the locking lever 30 has the curved surface 32 at a portion which corresponds to the guide pin 22 at the closed position of the fuel door 20, so that the guide pin 22 can get on the curved surface 32 to move and simultaneously the guide pin 22 can push the curved surface 32 so that the rotation of the locking lever 30 can be performed when the guide pin 22 is rotated to be moved by the rotation of the fuel door 20.

That is, in order to clearly identify the user's will of opening the fuel door 20 in the present disclosure, all the operation of the switch for opening the fuel door provided inside the vehicle and the operation directly pushing the fuel door 20 should be performed. Herein, in case of pushing the fuel door 20, the fuel door 20 is rotated in the closed direction so that the guide pin 22 gets on the curved surface 32 of the locking lever 30 to move in the closed direction of the fuel door 20. The curved surface 32 is recessed to form a protruded shape at both ends thereof. Due to this, when the user pushes the fuel door 20 so that the fuel door 20 is rotated in the closed direction, the guide pin 22 gets on the curved surface 32 of the locking lever 30 and moves to rotate the locking lever 30, and since both ends of the curved surface 32 form a protrude shape, it is possible to secure a sufficient rotation amount that the locking lever 30 can separate from the restraining lever 40.

On the other hand, as shown in FIG. 5, a dented portion 34 which induces the guide pin 22 to enter when the guide pin 22 rotates at the opening position of the fuel door 20 in the closed direction, may be formed at one end portion 30a of the locking lever 30, and the dented portion 34 whose inclination gradually increases in the closed direction of the fuel door 20 may be formed.

The guide pin 22 may pass through the locking lever 30 of the present disclosure when the fuel door 20 rotates at the opening position in the closed direction, and the guide pin 22 is caught on the locking lever 30 when the fuel door 20 rotates at the closed position in the opening direction so that the locking lever 30 should be rotated together with the guide pin 22. For this, the dented portion 34 whose inclination gradually increases in the closed direction of the fuel door 20 is formed at one end portion 30a of the locking lever 30, so that the guide pin 22 enters the lower inclined portion of the dented portion 34 and passes through the locking lever 30 when the fuel door 20 rotates at the opening position in the closed direction, and the guide pin 22 is caught on the higher inclined portion of the dented portion 34 when the fuel door 20 rotates at the closed position in the opening direction. Due to this, when the fuel door 20 rotates at the opening position in the closed direction, the guide pin 22 passes through the locking lever 30, so that the fuel door 20 can be returned to the state before the next opening operation at the closed position, and the guide pin 22 is caught on the locking lever 30 so that the guide pin 22 is not rotated by the restraint of the locking lever 30 and the fuel door 20 to which the guide pin 22 is coupled can be fixed at the closed position.

The dented portion 34 may also have an inclination in a direction away from the rotation center point of the fuel door 20, and the inclination angle may be formed to be larger in the closed direction of the fuel door 20. Due to this, the fuel door 20 rotates at the opening position in the closed direction so that the guide pin 22 gets on the inclined surface of the dented portion 34 to push the locking lever 30 when the guide pin 22 passes through one end portion of the locking lever 30. Accordingly, the locking lever 30 can be rotated in the opening direction of the door, and the locking lever 30 can be returned in the state of being caught on the restraining lever 40.

The guide pin 22 for this may be inserted into an inserting groove 24 formed at the fuel door 20 and elastically supported by an elastic spring S1 in the inserting groove 24, so that the guide pin 22 can be drawn out of the fuel door 20 by the elastic spring S1 and entered while compressing the elastic spring S1 when passing through the locking lever 30.

On the other hand, as shown in FIGS. 3 to 4, the restraining lever 40 may be installed to be rotatable through the second hinge part H2 on the door housing 10 and a catching protrusion 42 may be formed at one end portion 40a to protrude toward the locking lever 30 so that the other end portion 30b of the locking lever 30 is caught on it. Herein, an end of the other end portion 30b of the locking lever 30 may be curved, and the catching protrusion 42 of the restraining lever 40 may protrude in a streamline manner.

The second hinge part H2 may be mounted at the one end portion 40a of the restraining lever 40 to be rotatable in the door housing 10, and the catching protrusion 42 may protrude from the one end portion 40a so that the other end portion 30b of the locking lever 30 is caught on it. When the second hinge part H2 is installed at the one end portion 40a of the restraining lever 40 to form the rotation center point, so that the rotation radius of the other end portion 40b is secured and the contact or contact-releasing of the drive controller 50 is divided to correctly be performed.

Further, the catching protrusion 42 of the restraining lever 40 protrudes in a streamline manner and the end of the other end portion 30b of the locking lever 30 has a curved shape, so that the other end portion 30b of the locking lever 30 gets on the curved surface of the catching protrusion 42 of the restraining lever 40 and smoothly moves to perform push operation when the locking lever 30 rotates by the rotation of the guide pin 22 together with the fuel door 20.

On the other hand, as shown in FIG. 3, one end portion of the locking lever 30 may be connected with the other end portion of the restraining lever 40 through the restoring spring S2, so that the positions of the locking lever 30 and the restraining lever 40 can be returned to its original positions. In addition, a separate bracket may be formed at the door housing 10 in order to limit the rotation amounts of the locking lever 30 and the restraining lever 40. The technique of restricting the amount of rotation of a specific rotating body is a common technique and not illustrated in the drawings.

On the other hand, a restraining hole 44 may be formed at the other end portion 40b of the restraining lever 40, and the drive controller 50 may be provided with a restraining pin 52 which inserts into the restraining hole 44 to limit the rotation of the restraining lever 40 when the drive controller 50 is operated. That is, the drive controller 50 may be composed of a solenoid device of which the restraining pin 52 protrudes when the user operates the switch for opening the fuel door inside the vehicle, and the restraining hole 44 into which the restraining pin 52 is inserted penetrates the other end portion 40b of the restraining lever 40, so that the rotation of the restraining lever 40 is limited when the restraining pin 52 is inserted into the restraining hole 44.

Herein, the drive controller 50 is to maintain the closed state of the fuel door 20, and in the state that the fuel door 20 is at the closed position and the other end portion 30b of the locking lever 30 is caught on the one end portion 40a of the restraining lever 40, the restraining pin 52 of the drive controller 50 may be disposed to correspond to the restraining hole 44 of the restraining lever 40. Therefore, when the restraining pin 52 of the drive controller 50 is inserted into the restraining hole 44 of the restraining lever 40, the rotation of the restraining lever 40 is limited so that the locking lever 30 can be held in the caught state by the restraining lever 40.

When the restraining pin 52 of the drive controller 50 is inserted into the restraining hole 44 of the restraining lever 40, the rotation of the restraining lever 40 is limited, so that the rotation of the locking lever 30 caught on the restraining lever 40 is also limited and the closed position of the fuel door 20 is fixed. Conversely, when the restraining pin 52 of the drive controller 50 gets out of the restraining hole 44 of the restraining lever 40, the rotation of the restraining lever 40 is allowed, so that the locking lever 30 can be rotated and the fuel door 20 can be opened.

On the other hand, as shown in FIGS. 1 to 2, the door housing 10 may be composed of a mounting body 10a at which the locking lever 30, the restraining lever 40 and the drive controller 50 are installed and a fuel supply space 10b with which a fuel inlet is provided. Herein, the locking lever 30, the restraining lever 40 and the drive controller 50 may be installed to be moved together at the mounting body 10a of the door housing 10, and a space in which the fuel inlet is arranged, as shown in FIG. 2, may be provided at the fuel supply space 10b integrally extended from the mounting body 10a.

The fuel door 20 installed at the door housing 10 may be composed of the door plate 20a of which one end portion is extended to the mounting body 10a and installed to be rotatable at the mounting body 10a and the other end portion is extended to the fuel supply space 10b, and the door panel 20b coupled to the door plate 20a and formed to close the fuel supply space 10b.

The fuel door 20 is composed of the door plate 20a and the door panel 20b, and the door plate 20a is installed to be rotatable on the mounting body 10a, so that the guide pin 22 is rotated in a circle with respect to the rotation center point of the door plate 20a. Further, the door panel 20b may be formed to cover the fuel supply space 10b and does not allow foreign material of the outside to flow into the fuel inlet side of the fuel supply space 10b in the closed position of the fuel door 20.

On the other hand, as shown in FIGS. 3 to 4, one end portion of the drive controller 50 and the doorplate 20a are installed inside the mounting body 10a, the locking lever 30 and the restraining lever 40 are installed outside the mounting body 10a, the one end portion of the door plate 20a is provided with the guide pin 22, and the guide pin 22 can be exposed from the inside of the mounting body 10a to the outside. Further, a guide hole 16 may be formed at the mounting body 10a to extend along the radius that the guide pin 22 rotates together with the rotation of the fuel door 20.

By separating the locking lever 30, the restraining lever 40, and the drive controller 50 to the inside and outside of the mounting body 10a, the interlocking relationship of the respective components can be smoothly performed. That is, one end portion of the door plate 20a and the drive controller 50 are provided inside the mounting body 10a, the locking lever 30 and the restraining lever 40 are provided outside the mounting body 10a, so that the fuel door 20 can be smoothly rotated without interfering with the locking lever 30 and the restraining lever 40 when rotates and the locking lever 30 can be disposed to be corresponded to the rotation radius of the guide pin 22.

The operation of the fuel door apparatus for the vehicle according to the present disclosure described above is as follows.

As shown in FIG. 1, when the fuel door 20 is in the closed position, the locking lever 30 is caught on the restraining lever 40 to be fixed as shown in FIG. 3. Further, the restraining pin 52 of the drive controller 50 is fastened to the other end portion 40b of the restraining lever 40 so that the position of the restraining lever 40 is fixed, and the rotation of the locking lever 30 caught on the catching protrusion 42 of the restraining lever 40 is also limited. Due to this, the guide pin 22 of the fuel door 20 is contacted with and supported by the locking lever 30 whose the position is fixed, so that the rotation of the fuel door 20 is limited.

In this state, in order to open the fuel door 20, when the user operates the switch inside the vehicle so as to open the fuel door, the restraining pin 52 of the drive controller 50 is separated from the restraining hole 44 of the restraining lever 40 by operation of the restraining pin 52 of the solenoid device in the drive controller 50 so that the restraining lever 40 can be rotated. Further, the user presses the fuel door 20 with the opening will of the fuel door 20, so that the fuel door 20 rotates in the inside direction of a vehicle body and then the guide pin 22 mounted in the fuel door 20 moves in the "A" direction of FIG. 4. At this time, the locking lever 30 is pushed by the guide pin 22 and rotates in a direction that separates from the restraining lever 40, and the end of the other end portion 30b of the locking lever 30 gets on and passes the catching protrusion 42 of the restraining lever 40, so that the restrain of the locking lever 30 and the restraining lever 40 is released. Thus, when the rotation of the locking lever 30 is allowed, the rotation of the guide pin 22 of the fuel door 20 is also allowed, so that the fuel door 20 receives the elastic force of the elastic member 12 to rotate about the hinge pin 14. The fuel door 20 is rotated at the door housing 10, as shown in FIG. 2, the fuel door 20 is popped up to move to the opening position thereof.

On the other hand, in case of moving the fuel door 20 to the closed position again, the user pushes the fuel door to close it. In case of rotating the fuel door 20 in the closed direction, the guide pin 22 of the fuel door 20 moves along the guide hole 16 of the door housing 10. Herein, as the dented portion 34 is formed at the locking lever 30 in order for the guide pin 22 to enter into and pass through it, the guide pin 22 together with the fuel door 20 rotates in the closed direction to pass through the locking lever 30. The dented portion 34 of the locking lever 30 is formed to gradually increase in inclination in the closed direction of the fuel door 20, has also the inclination in a direction away from the center of rotation of the fuel door 20, and formed in such a manner that the angle of inclination increases in the closed direction of the fuel door 20, so that the guide pin 22 pushes the locking lever 30 along the shape of the dented portion 34. The locking lever 30 is rotated again in the opening direction of the fuel door 20 by the shape of the dented portion 34 when the guide pin 22 gets on the dented portion 34 to move and is again caught on the restraining lever 40. Due to this, the fuel door 20 is returned to the closed position and the locking lever 30 is returned to its initial position caught on and restrained by the restraining lever 40.

According to the fuel door apparatus for the vehicle having the above-described structure, depending on the opening and closing will of the fuel door 20, the open or close operation of the fuel door 20 is clearly performed, the structure in which the fuel door 20 pops up when the fuel door 20 is opened and the structure in which the fuel door 20 is closed at the time of closing the fuel door 20 are integrated to simplify the structure and manufacturing cost and weight can be reduced.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. A fuel door apparatus for a vehicle, comprising:
   a fuel door rotatable connected to a door housing, wherein the fuel door is connected with an elastic member of the door housing to receive an elastic force in an opening direction and includes a guide pin elastically moving;
   a locking lever rotatably connected to the door housing, wherein the locking lever has a first end portion disposed on a rotation radius of the guide pin, such that the guide pin passes by the locking lever along the rotation radius when the fuel door rotates from an opening position to a closed position, and the locking lever rotates with the guide pin when the fuel door rotates from the closed position to the opening position;
   a restraining lever spaced apart from the locking lever to be rotatable on the door housing, wherein the restraining lever has a first end portion disposed in a radius, on which a second end portion of the locking lever rotates, and is latched on the locking lever in the closed position; and
   a drive controller disposed in the door housing, wherein the driver controller is in contact with or separated from the restraining lever depending on whether the fuel door is opened or closed to selectively allow rotation of the restraining lever.

2. The fuel door apparatus of claim 1, further comprising:
   a hinge pin rotatably mounted on the door housing, such that the fuel door rotates on the hinge pin,
   wherein a first end portion of the elastic member is connected with the door housing and a second end portion of the elastic member is fixed to the hinge pin to provide the elastic force so that the fuel door rotates together with the hinge pin.

3. The fuel door apparatus of claim 1,
   wherein the locking lever is spaced apart from a rotation center point of the fuel door and disposed on the door housing to be rotatable through a first hinge of the locking lever, and
   the first end portion of the locking lever has a curved surface at a portion corresponding to the guide pin at the closed position.

4. The fuel door apparatus of claim 1, wherein the locking lever has a dented portion at the first end portion of the locking lever such that the guide pin is latched on the dented portion when the fuel door rotates from the opening position to the closed position,
   wherein the dented portion has an inclined surface, an inclination of which gradually increases toward an end of the first end portion of the locking lever.

5. The fuel door apparatus of claim 1, further comprising:
   an inserting groove, into which the guide pin is inserted, in the fuel door,
   wherein the guide pin is elastically supported by an elastic spring disposed inside the inserting groove.

6. The fuel door apparatus of claim 1, further comprising:
   a second hinge part through which the restraining lever is rotatable installed on the door housing; and
   a catching protrusion protruding toward the locking lever at a first end portion of the restraining lever such that the second end portion the locking lever is latched on the catching protrusion.

7. The fuel door apparatus of claim 6,
   wherein an end of the second end portion of the locking lever has a curved surface; and
   the catching protrusion of the restraining lever protrudes in a streamline shape.

8. The fuel door apparatus of claim 1, wherein the first end portion of the locking lever and the second end portion of the restraining lever are connected with each other through a restoring spring.

9. The fuel door apparatus of claim 1, wherein the restraining lever comprises:
   a restraining hole at the second end portion of the restraining lever,
   wherein the door housing includes a retraining pin, which is inserted into the restraining hole to limit rotation of the restraining lever when the drive controller operates.

10. The fuel door apparatus of claim 9, wherein the drive controller operates such that the restraining pin corresponds to the restraining hole of restraining lever when the fuel door is in the closed position and the first end portion of restraining lever is latched on the second end portion of the locking lever.

11. The fuel door apparatus of claim 1,
    wherein the door housing includes:
    a mounting body to which the locking lever, the restraining lever, and the drive controller are mounted; and
    a fuel supply space having a fuel inlet,
    wherein the fuel door comprises:
    a door plate having first end portion extending to and mounted on the mounting body and a second end portion extending to the fuel supply space; and
    a door panel coupled to the door plate and formed to close the fuel supply space.

12. The fuel door apparatus of claim 11,
    wherein the drive controller and the first end portion of the door plate are disposed in the mounting body, and the locking lever and the restraining lever are disposed outside the mounting body,
    wherein the guide pin is disposed at the first end portion of door plate and exposed from an interior toward an exterior of the mounting body.

13. The fuel door apparatus of claim 12, wherein the mounting body has a guide hole extending along a radius on which the guide pin rotates together with rotation of the fuel door.

14. The fuel door apparatus of claim 1, wherein the elastic member includes a coil spring.

* * * * *